United States Patent [19]

Goellner

[11] 3,709,075
[45] Jan. 9, 1973

[54] METHOD AND APPARATUS FOR CUTTING A WORKPIECE
[75] Inventor: Willy J. Goellner, Rockford, Ill.
[73] Assignee: Paramount Textile Machinery Co., Chicago, Ill.
[22] Filed: March 4, 1971
[21] Appl. No.: 121,066

[52] U.S. Cl. .................83/27, 83/107, 83/113, 83/466
[51] Int. Cl. .....................B26d 7/06, B26d 7/02
[58] Field of Search....83/27, 107, 113, 466, 82, 129, 83/135, 154, 282, 277, 110, 461; 214/1 BB; 143/46 F

[56] References Cited

UNITED STATES PATENTS 2,064,017  12/1936  Leschen.........................143/46 R X
3,426,631  2/1969  Sandberg................................83/82

Primary Examiner—Frank T. Yost
Attorney—Burns, Doane, Swecker & Mathis

[57] ABSTRACT

A method and apparatus for severing a workpiece with a cutting tool returnable through the kerf or cut made thereby and wherein at least one translatable slide is employed to move the uncut major portion of the workpiece in a generally linearly direction away from the kerf prior to return of the cutting tool. For enhancing measuring accuracy and life, provision is made for applying a slide moving force so as to minimize the moment exerted on the slide about the ways on which the slide is slidably moved during the translation. With the slide clamped to upper and lower slide surfaces of generally parallel ways, such minimization may be accomplished through the application of the slide moving force generally centrally of those way slide surfaces. For this purpose, a lever having a generally arcuate force transmitting surface may be employed to engage with a driven surface of the slide at a contact zone which remains substantially constant within the range of linear movement of the slide.

In order to accomodate for the feeding of workpiece portions having a bent or crooked end to a generally L-shaped supporting surface, the orientation of the workpiece relative to that surface may be adjusted prior to feeding the workpiece. Generally oppositely facing clamps movable between retracted and extended positions alter that orientation through the adjustment of the extended position of one clamp.

21 Claims, 6 Drawing Figures

INVENTOR
WILLY J. GOELLNER

BY Burns, Doane, Swecker
& Matus

ATTORNEYS

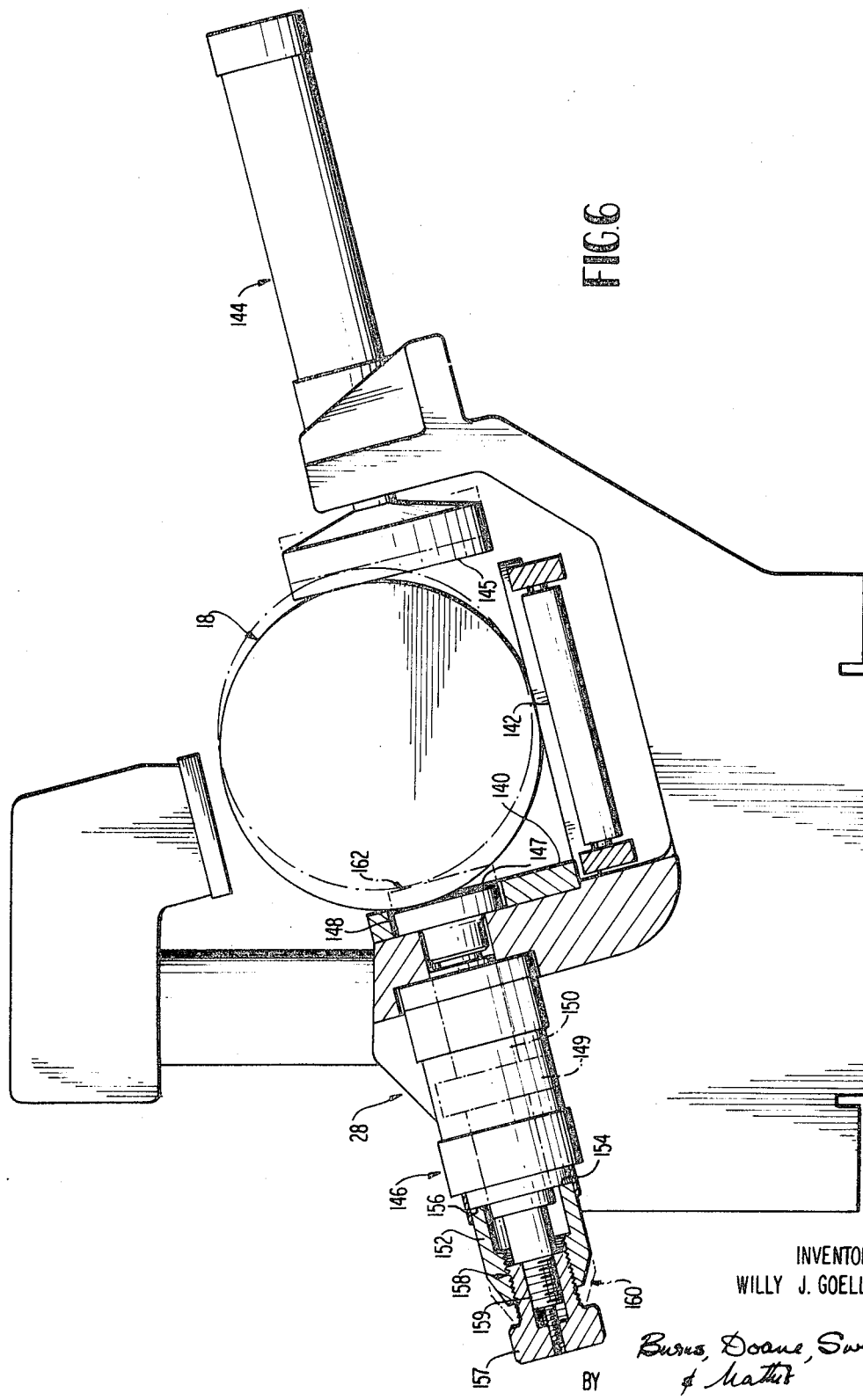

METHOD AND APPARATUS FOR CUTTING A WORKPIECE

BACKGROUND OF THE INVENTION

This invention relates to cutting operations for sequentially severing the end portion of a workpiece from the remainder thereof. More particularly, this invention relates to a cutting apparatus and method involving the return movement of a cutting tool through the kerf or cut made thereby, prior to which the severed portions of the workpiece are separated. This invention additionally relates in particular to the adjustment of the orientation of a workpiece relative to its support at the cutting zone, prior to the feeding of the workpiece to that zone.

As demonstrated in copending application Ser. No. 838,220, now U.S. Pat. No. 3,572,200, filed July 1, 1969 for "Method and Apparatus for Spreading Severed Portions of a Workpiece," and in copending application Ser. No. 88,547 filed Dec. 12, 1970 for "Cutting Apparatus and Method," both assigned to the assignee of the present invention, cutting operations involving the return of a cutting tool through the kerf may be significantly enhanced through the provision of at least one translatable slide means generally linearly movable in generally opposite linear directions toward and away from the location at which the workpiece is severed. Such a slide means moves one of the severed workpiece portions away from the zone of the cut, and may also be employed to return the severed portion of the workpiece to a measuring location.

In machines such as are disclosed in the aforementioned applications, the slide means may be advantageously positively clamped to upper and lower surfaces of ways slidably supporting the slide means.

Although the overall machine operation according to the technique in the aforesaid applications partakes of significant advantages, it will be recognized that the application of the slide moving force in the particular manner disclosed in those applications may produce a vertical tilting moment on the slide about the way surfaces. It will also be appreciated that this moment may ultimately have some undesirable consequences from the standpoint of wear and measuring accuracy.

It would, therefore, be desirable to retain the advantages of the foregoing technique while further enhancing measuring accuracy and life by applying a slide moving force so as to effectively minimize the vertical tilting moment exerted on the slide about the ways. This would be particularly desirable in instances wherein the feature of clamping the slide to upper and lower way surfaces is involved. In such instances, adverse effects of a moment on the slide about the ways might be significantly greater by reason of that clamped engagement with the upper and lower way surfaces.

In the foregoing applications, the utilization of a generally L-shaped supporting surface facing the movable cutter means is also disclosed. The end portion of the workpiece may be fed to that supporting surface in any suitable manner, such as by means of a slidable feeder clamp. Where generally straight workpiece portions are to be fed, the slidable feeder clamp may be employed to locate the workpiece portion on the generally L-shaped support surface in a convenient fashion. However, in instances wherein the workpiece is generally bent or crooked adjacent the end to be fed onto the support shelf, utilization of the slidable feeder may be hampered through the interference of the workpiece end portion with the support surface portions of the support shelf.

It would, therefore, be desirable to provide for adjustable orientation of the workpiece relative to the support shelf in a manner which would effectively eliminate the problems associated with such interference prior to feeding the workpiece generally longitudinally to its support position.

OBJECTS AND SUMMARY OF THE INVENTION

It is therefore a general object of the invention to provide a novel method and apparatus for cutting a workpiece that eliminates problems of the sort previously noted.

It is a particular object of the invention to provide such a method and apparatus wherein measuring accuracy and life may be enhanced through minimization of the moment exerted on the slide about ways on which the slide is moved during translation.

It is an independent object of the present invention to provide a novel method and apparatus wherein the orientation of workpiece relative to a generally L-shaped supporting surface may be adjusted prior to feeding the workpiece to its support position where it is to be severed.

A preferred embodiment of the invention intended to accomplish at least some of the foregoing objects includes a cutting apparatus for sequentially severing the end portions of a workpiece from the remainder thereof and comprised of a stationary base member, and support means mounted on the stationary base member for supporting the workpiece. A cutter means, movable relative to the workpiece for severing the workpiece into first and second portions, and returnable relative to the workpiece through the cut made thereby, is provided. At least one translatable slide means is employed for generally linearly moving one of the severed portions in a generally linearly direction away from the cut. The slide means includes at least a portion of the support means.

Way means slidably support the translatable slide means and define upper and lower slide surfaces extending generally longitudinally in the generally linear direction of slide means travel. The translatable slide means includes clamping means for clamping the slide to both the upper and lower slide surfaces of the way means.

Slide moving means for translating the slide means along the upper and lower surfaces in that generally linear direction, and in a direction generally opposite thereto, is employed to minimize the moment of the slide about the way surfaces. This may be accomplished through driving means for applying a slide moving force in a generally longitudinally extending driving direction intermediate the upper and lower slide surfaces.

Advantageously the way means may include first and second generally parallel ways each having upper and lower way surfaces. With the driving means operative to apply the slide moving force generally centrally of the parallel upper and lower way surfaces, the moments on the slide about the upper and lower way surfaces may effectively cancel one another.

Such force application may be accomplished through a pivotal lever having a pivot arm engageable with a portion of the slide means. The arm may include a generally arcuate force transmitting surface engageable with driven surfaces of the slide means disposed generally transversely of the generally linear direction of slide travel. During pivoting of the lever means, an arcuate force transmitting surface may engage the driven surfaces of the slide means along a contact zone which remains substantially constant within the range of linear movement of the slide means.

With the lever means in the form of a bell crank lever, adjustable stop means engageable with a second pivot arm of that lever means may be utilized to control the limits of travel of the slide means.

The driven surfaces and the force transmitting surfaces may be comprised of case hardened steel to provide resistance to wear and abrasion, while the remaining portions of the slide means and slide moving means may be cast or otherwise formed as desired.

Of independent significance is the provision for adjusting the orientation of the workpiece relative to a generally L-shaped supporting shelf extending generally transversely of the path of movement of the cutter means. Such orientation adjustment may be utilized whether or not a slide means or the moment minimizing techniques of the present invention are employed. A feeder slide is operative to feed the end portion of the workpiece generally longitudinally onto the generally L-shaped supporting shelf.

For adjusting the orientation of the workpiece relative to the supporting shelf prior to feeding operation of the feeder slide, adjustable clamping means is provided on the feeder slide. The clamping means may take the form of a generally oppositely facing first and second clamping surfaces each movable between a retracted position and an extended position. Adjusting means for adjusting the extended position of at least one of the clamping surfaces, and means for extending and retracting the clamping means are operative to relocate the workpiece so as to avoid interference of the workpiece with the supporting shelf during feeding.

Preferably, the clamping surfaces are provided as one end of first and second, fluid operable, clamp means one of which has a selectively predetermined adjustable length of travel. The other of the clamp means is movable to an extended position dependent upon the size of the workpiece and the adjusted extended position of the first clamp means. The extension force for the adjustable clamp means advantageously exceeds the extension force applied to the other clamp means.

THE DRAWINGS

Other objects and advantages of the present invention will become apparent from the subsequent detailed description of the present invention with reference to the accompanying drawings, wherein like numerals refer to like elements and in which:

FIG. 6 is an elevational view illustrating means for adjusting the orientation of the workpiece according to the present invention.

DETAILED DESCRIPTION

General Summary

Figure 1:
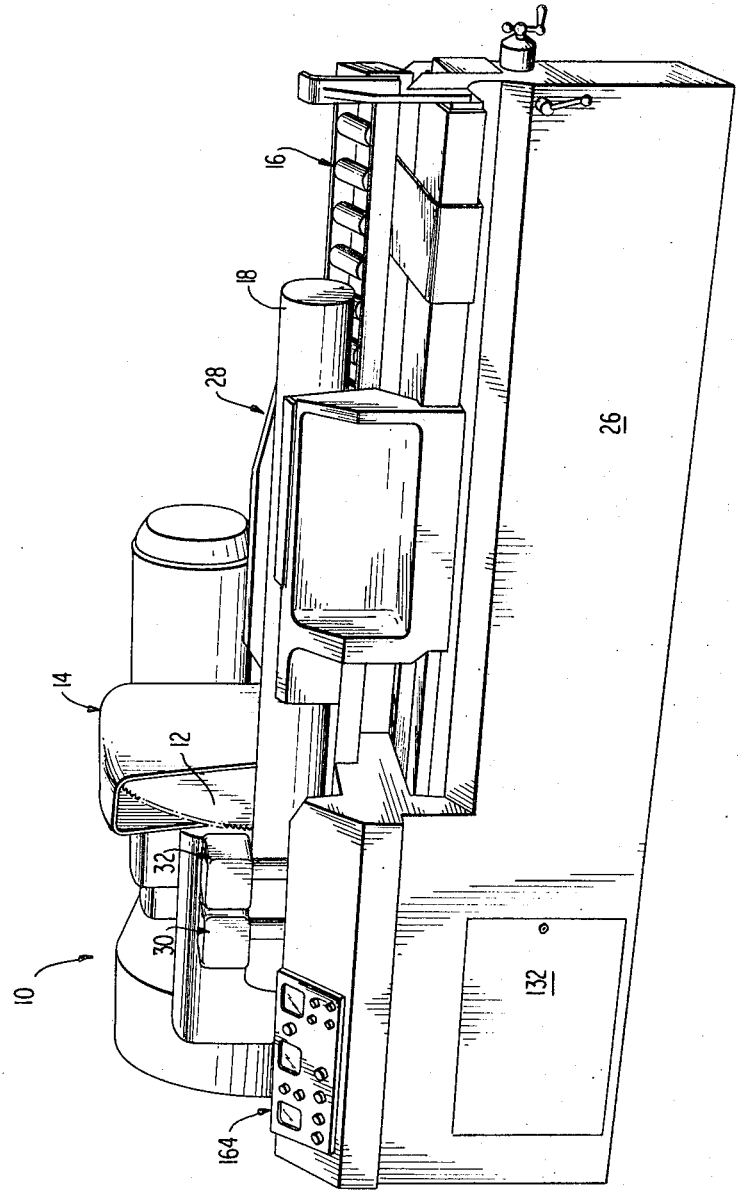
FIG. 1 is an overall perspective view, partially schematic, of a cutting apparatus according to the present invention.
Figure 2:
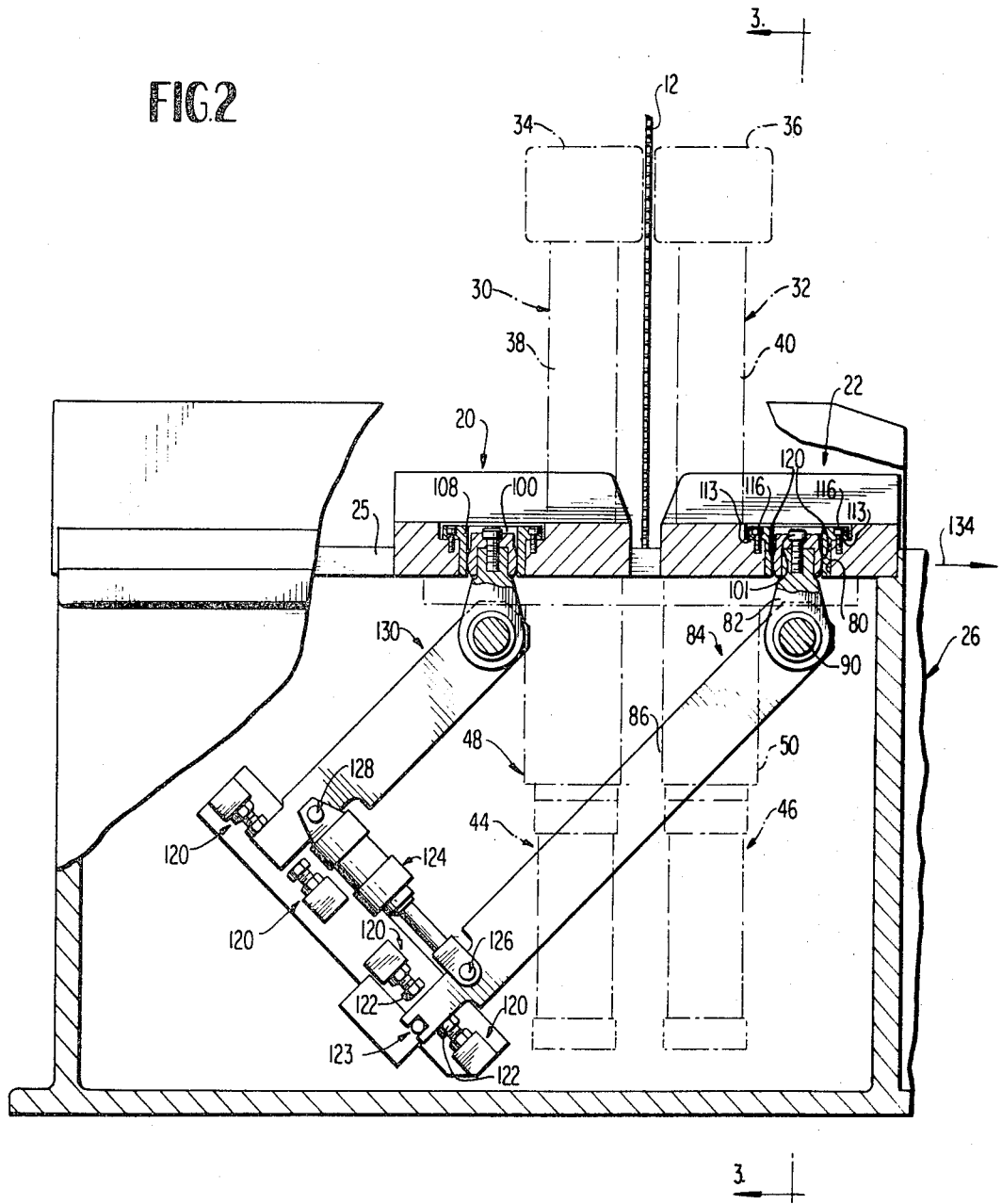
FIG. 2 is a side elevational view, partially broken-away, of a portion of the apparatus of FIG. 1 and illustrating a preferred form of slide moving means according to the present invention.

Referring now to the drawings, and particularly to FIGS. 1 and 2, a cutting machine 10 according to a preferred embodiment of the present invention is there shown.

The cutting machine 10 includes a rotatable carbide tipped saw blade 12 mounted for reciprocating movement on a slidable base 14. Any suitable motor means (not shown) may be employed to provide the translating and rotating movement of the saw blade 12. Antibacklash gearing is particularly desirable for this purpose.

Disposed generally transversely of the path of translation of the saw blade 12 is a workpiece support assembly. This support assembly may include a roller-type support means 16 (FIG. 1) on which the major portion of a bar 18 of stock material rests. The end of the bar 18 to be severed is supported on each of two slide means or slide assemblies 20 and 22 (FIG. 2), with these slide means being situated on opposite sides of the plane of translation of saw blade 12, i.e., on opposite sides of the location of which the cut is to be made.

Each slide assembly is slidably mounted on spaced ways 24 and 25 suitably fixed to a stationary base 26. These ways 24 and 25 serve to guide the slide assemblies 20 and 22 for translation therealong. As subsequently elaborated, provision is made for translating the slide means in a generally linear direction toward and away from the location of the cut while minimizing the moment exerted on the slide means about the ways 24 and 25.

Although two slide assemblies 20 and 22 are illustrated, only one such slide assembly need be employed in conjunction with movement of the uncut major portion of the workpiece 18 as pointed out in the previously identified copending applications, Ser. Nos. 838,220, now U.S. Pat. No. 3,572,200, and 88,547.

Mounted on the stationary base 26 in any suitable manner for slidable movement along the roller-type support assembly 16 is a feeder slide 28. In a manner hereinafter more fully described, the feeder slide is operative to translate the workpiece 18 to position the end of the workpiece to be severed at a proper location on the slide assemblies 20 and 22. Also, as hereinafter more fully described, provision is made for adjusting the orientation of the workpiece relative to the slide assemblies 20 and 22 prior to such a feeding operation.

Each of the slide assemblies 20 and 22 carries a clamping assembly 30, 32 which preferably functions to both clamp the workpiece 18 to the slide assemblies 20 and 22 and to clamp the slide assemblies to the ways 24 and 25. For this purpose, the clamping assemblies 30, 32 each include a vice 34, 36 extending upwardly of the support assemblies 20 and 22. Connected with each vice 34, 36 for controlling the movement thereof is a rod 38, 40.

Each rod is ultimately connected to a piston (one of which is schematically indicated at 42 in FIG. 3) telescopingly received within a floating cylinder 44, 46. The cylinders 44, 46 are preferably rendered floating through attachment to floating sleeves 48 and 50 for movement therewith.

Figure 3:
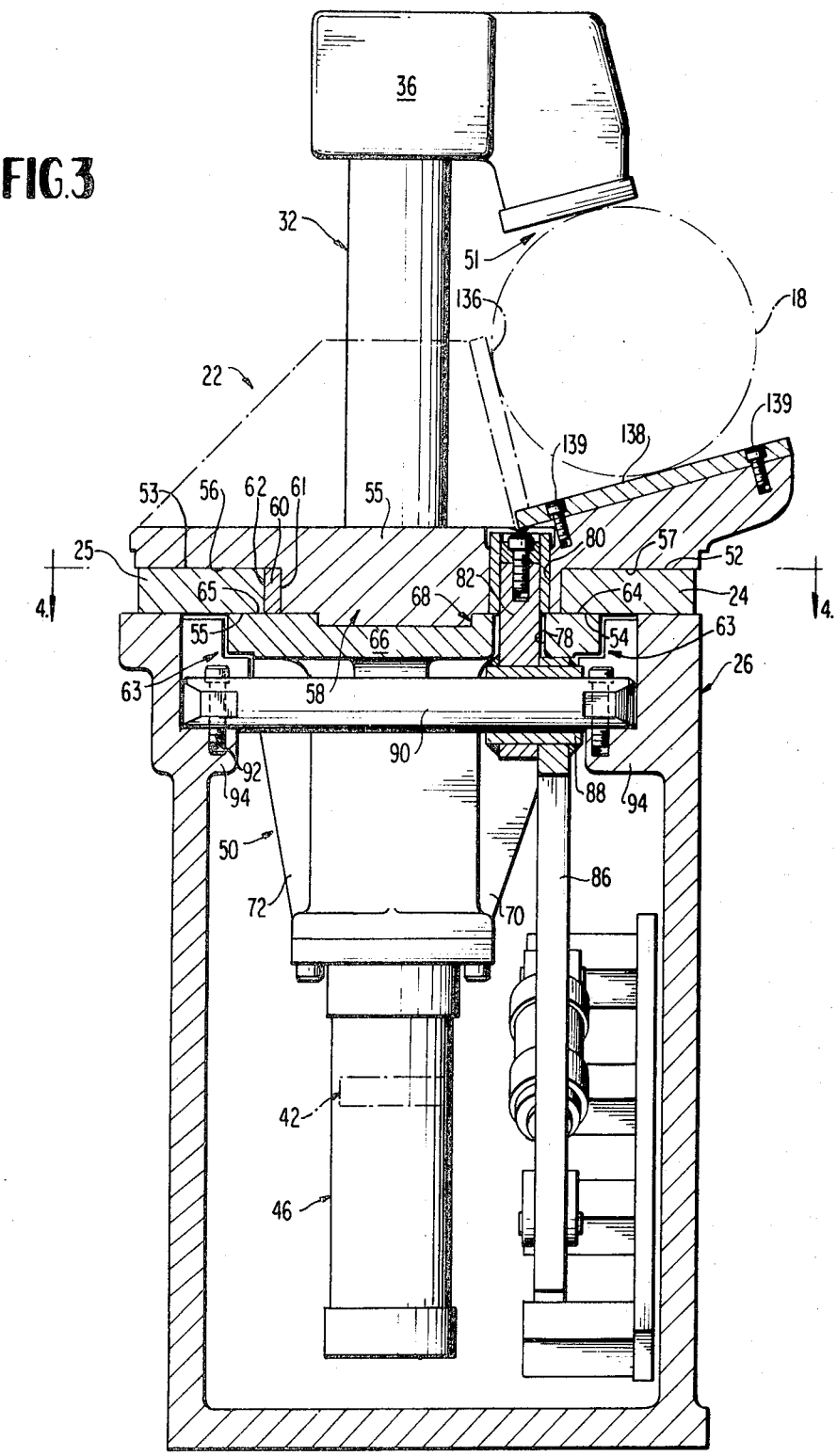
FIG. 3 is a cross-sectional elevational view taken along line 3—3 of fig. 2.

At the time it is desired to clamp the workpiece to the slide assemblies 20 and 22 (usually prior to severing the workpiece), the vices 34 and 36 may be lowered into engagement with the workpiece 18 as indicated at 51 (FIG. 3). Preferably, the slide assemblies are at the same time clamped to the ways 24 and 25 by upward movement of the floating sleeves 48, 50 and cylinders 44, 46.

The structure thus far described may be generally similar in structure and operation to that described in the previously identified patent applications (Ser. Nos. 838,220, now U.S. Pat. No. 3,572,200, and 88,547), the disclosures of which are hereby incorporated by reference. However, according to the present invention, the details of the construction of the slide assemblies 20 and 22, as well as the manner of effecting their translation differ from those set forth in the prior applications in order to tend to minimize the moment exerted on the slide assemblies about the ways 24 and 25 during translation. Furthermore, according to the present invention the orientation of the workpiece 18 relative to supporting surfaces of the slide assemblies 20 and 22 may be adjusted prior to a feeding operation so as to accomodate for irregularly shaped workpieces such as those having bent or crooked ends.

Figure 4:
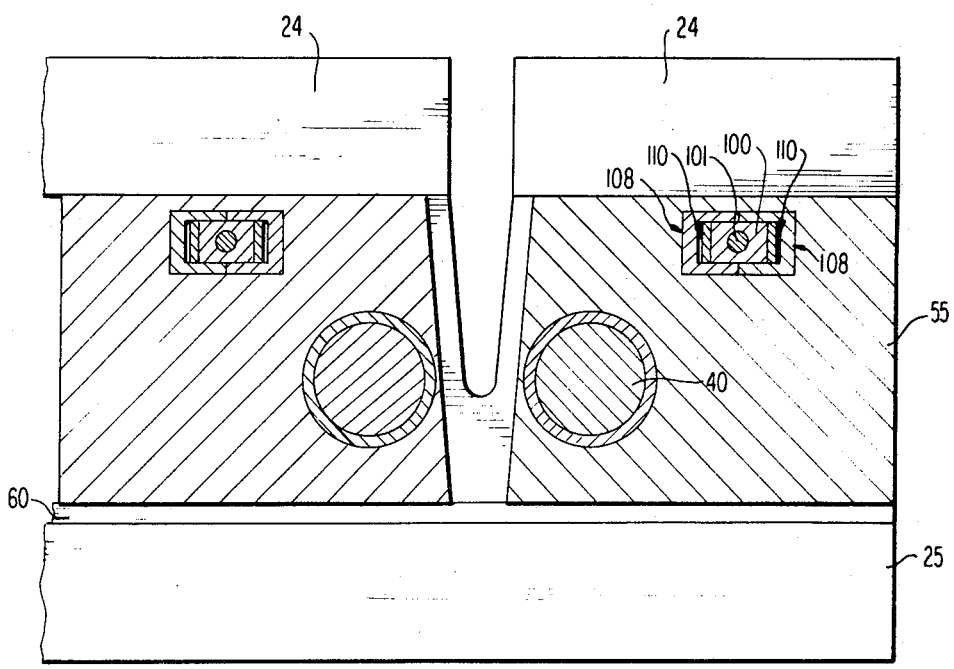
FIG. 4 is a cross-sectional view taken along line 4—4 of FIG. 3.
Figure 5:
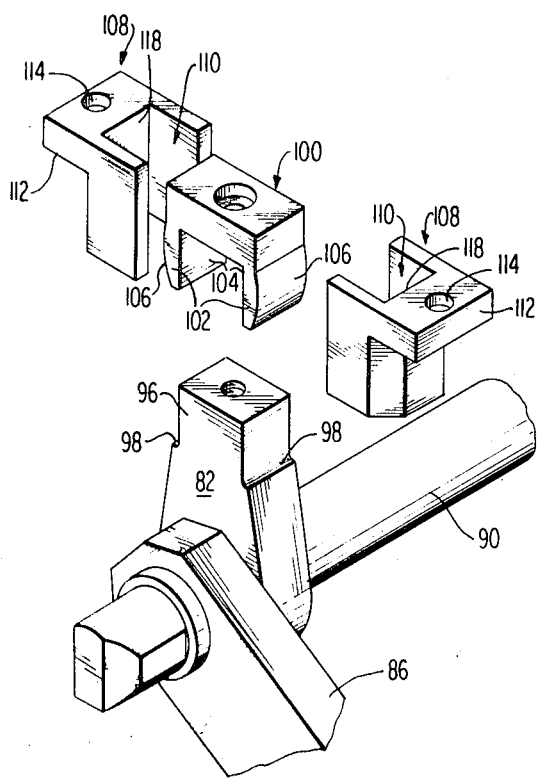
FIG. 5 is an exploded assembly view of a preferred form of slide moving means according to the present invention.

DETAILED STRUCTURE AND OPERATION:

With continued reference to FIGS. 2 and 3, and with reference to FIGS. 4 and 5, the nature of the slide translation according to the present invention may be understood.

In the preferred and illustrated form of the invention, the ways 24 and 25 are generally parallel and each includes an upper slide surface 52, 53 and a generally parallel lower slide surface 54, 55. These surfaces extend generally longitudinally in the generally linear direction of translatable movement of the slide assemblies 20 and 22. The slide assemblies 20 and 22 are substantially identical and only one need be described with reference to the slide assembly 22 shown in FIG. 3. This assembly may include a base slide member 55 presenting downwardly facing flat surfaces 56, 57 resting respectively on the upper way surfaces 52, 53 for slidable movement therealong.

Projecting downwardly from these slide surfaces 56, 57 and generally centrally of the base slide member 55 is a central body portion 58. This body portion 58 projects into the space defined between the parallel ways 24 and 25. If desired, a somewhat flexible gib 60 may be positioned laterally of the body portion 58 between the lateral face 61 of that body portion 58 and the adjacent and generally parallel lateral portion 62 of the way 25. This gib 60 may function as a bearing surface during translation of the slide assembly 22, while accommodating for wear and stabilizing the slide assembly 22 during severance of the workpiece supported thereby. If desired another gib (not shown) may be similarly interposed between the other way 24 and the slide body portion 58.

When the workpiece 18 is clamped to the slide assembly 22, the lower way surfaces 54, 55 are engaged by the floating sleeve 50. The sleeve 50 is floatingly suspended from the slide base portion 55 so as to be movable vertically relative thereto while being translatable with the remainder of the slide assembly 22. During operation of the clamping means 32, the vice 36 is moved into engagement with the workpiece 18 and the reaction force in the cylinder 46 moves the sleeve 50 upwardly so as to clamp the slide assembly to the ways 24 and 25. Clearance, indicated at 63, is provided to accomodate such movement after which the upper sleeve surfaces 64, 65 are brought into clamping engagement with the lower way surfaces 54, 55, while the base slide portion 55 is clampingly engaged with the upper way surfaces.

The upper end 66 of the hollow sleeve 50 which presents the generally flat sleeve clamping surfaces 64, 65 may also be provided with a channel 68 between those surfaces. This channel receives the shouldered end of the slide body portion 58 when the floating sleeve is raised to its clamped position as illustrated in FIG. 3. If desired, the sleeve 50 may be provided with reinforcing ribs 70, 72.

For purposes of facilitating the driving of the slide assembly 22, both the upper end 66 of the floating sleeve 50 and the slide base 55 are provided with slots 78 and 80. These slots 78 and 80 are generally vertically aligned. Received within the aligned slots 78 and 80 is a driving arm 82 of a bell crank lever means 84 (FIG. 2). Another and longer arm 86 of the bell crank lever means 84 projects downwardly into the interior of the stationary base member 26 at an angle with respect to the driving arm 82.

Both of the lever arms 82 and 86 are integrally secured to a sleeve 88 journaled on a generally cylindrical pivot member 90. The pivot member 90 may be secured to the stationary base member 26 in any suitable manner, such as by means of threaded fasteners 92 cooperating with the pivot member 90 and flanged projections 94 internally of the stationary base member.

It will be appreciated that rotation of the longer arm 86 of the bell crank lever means 84 produces a rotation of the driving arm 82 about the pivot axis defined by the pivot bolt 90. Such movement of the driving arm 82 in turn produces generally linear movement of the slide member 22 along the ways 24 and 25.

With particular reference to FIG. 5 and FIG. 2, the manner in which driving forces are transmitted from the bell crank lever means 84 to the slide assembly 22 will be understood.

The upper end 96 of the driving lever arm 82 is formed in the shape of a generally rectangular prism. This upper end 96 defines shoulders 98 together with the base portion of the arm 82.

Received over the upper end 96 of the driving lever 82, and fastened thereto by means of a screw 101 or the like, is a generally U-shaped driving adapter 100. This adapter is provided with generally downwardly projecting arms 102 which may rest upon the shoulders 98 of the driving lever 82. The internal walls 104 of the arms 102 are generally flat and conformingly engage the side walls of the upper lever end 96.

However, the external walls of the arms 102 are defined by generally arcuate driving surfaces 106. These arcuate driving surfaces 106 cooperate with driven liner members 108 attached to the slide member 22. A small flat zone may be provided centrally of the driving face 106.

The driven liner members 108 are generally L-shaped in configuration and mirror image related. Each is provided with a slot 110 which together envelop the driving adapter 100. Flange projections or legs 112 of the liner members rest upon suitable shoulders 113 (FIG. 2) defined in the slide base 55 adjacent the upper end of the lever receiving slot 80. The legs 112 are apertured, as indicated at 114, to receive suitable securing fasteners 116. These fasteners 116 cooperate with the apertures 114 and aligned apertures in the shoulders 113 to secure the driven liner members 108 to the slide assembly 22 in the receiving slot 80. The liner members are configured so as to completely bound the receiving slot 80, as best viewed in FIG. 4, with the channels 110 completely surrounding the driving adapter 100.

In the retracted position of the slide assembly 22, the driving lever arm 82 is generally upright and the generally arcuate driving faces 106 of the driving adapter 100 each engage the adjacent driven surfaces 118 of the liner member 108, as indicated at 120 in FIG. 2. These driven faces are formed by one wall of the channels 110.

It will be appreciated that the driven surfaces 118 of the liner member 108 are disposed generally transversely to the path of generally linear movement of the slide assembly 22 along the ways 24 and 25. Advantageously, the driving adapter 100 and the liner members 108 may be case hardened steel while the remaining portions of the lever assembly and slide assembly may be cast or otherwise formed as desired. Moreover, the radius of curvature of the generally arcuate driving faces 106 of the driving adapter 100 is suitably configured so that the driving contact zone 120 between these faces 106 and the driven liner surfaces 118 remains substantially constant during pivoting of the lever assembly 84. In other words, the generally arcuate faces 106 drivingly engage the driven surfaces 118 in a substantially constant contact zone throughout the generally small range of movement of the slide assembly 22 in its generally linear path of travel. Such slide assembly movement occurs toward and away from the zone of the cut made by the cutter means 12, with one arcuate driving face 106 functioning to drive in each direction while the other arcuate driving face pivots substantially freely.

The range of slide movement is controlled by suitable stop assemblies 120 (FIG. 2) disposed on opposite sides of the end of the long lever arm 86 of the bell crank lever means 84. These stop assemblies 120 are adjustable, for example by means of adjustable bolts 122, to control the pivotal throw of the lever arm 86 and therefore the range of linear movement of the slide assembly 22.

The slide assembly is illustrated in FIG. 2 in the position adjacent the cutting zone. If desired, a suitable limit switch means 123 may be provided to cooperate with the end of the long lever arm to indicate that the movable slide assemblies 20, 22 have been displaced to their limits.

Pivotal movement of the long lever arm 86 may be accomplished effectively through a piston and cylinder assembly 124 pivotally secured to the lever arm 86 adjacent one end thereof, as indicated at 126. The other end of the piston and cylinder assembly 124 is pivotally secured, as indicated at 128, to the long lever arm of a substantially identical bell crank lever means 130 provided for driving the other slide assembly 20. Except for the shorter length of the arm connected to the piston and cylinder assembly 124, this second bell crank lever means 130 is substantially identical to the previously described bell crank lever means 84. Insofar as the stop assembly, liner members and driving adapter are also substantially identical in the case of driving of the other slide assembly 20, a detailed discussion is not deemed necessary. Identical parts are, however, labeled with identical reference numerals.

It will be appreciated that the foregoing structure effectively realizes the mechanical advantage of the bell crank lever assemblies 84 and 130. This is particularly advantageous where the slide assemblies are driven while clamped to both the upper and lower way surfaces during the travel of the slide members along their generally linear paths. To accomplish such travel, it will be appreciated that the frictional engagement along the upper and lower surfaces of the ways 24 and 25 must be overcome. Through the foregoing technique, this frictional engagement may be overcome without the application of excessively large initial forces by the piston and cylinder assembly 124, insofar as a small force applied to the long lever arms results in a greater force applied to drive the slide assemblies.

Moreover, it will also be appreciated that the stops 120 providing limits of travel of the slide members 20 and 22 (being external in nature with respect to the lever arms with which they cooperate) are readily adjustable without the need to disassemble any mechanisms. A suitable access means, such as that indicated at 132 (FIG. 1) may be provided in the stationary base 26 to facilitate such adjustment.

Significantly, any vertically tilting moment exerted on the slide members 20 and 22 about the ways 24 and 25 during travel of the slide members may be substantially or completely eliminated in the preferred form of the invention. With the contact zone 120 between the generally arcuate driving faces 106 and the liner driven surfaces 118 maintained substantially at the center line of the generally parallel ways 24 and 25 (indicated by the arrow 134 in FIG. 2), the driving force produces cancelling torques about the upper and lower way guide surfaces. As will be apparent, this not only minimizes wear but enhances measuring accuracy.

Although the preferred form of the invention involves the use of generally parallel way members 24 and 25 and their parallel upper slide and guide surfaces 56, 57 and lower slide and guide surfaces 64, 65, the advantages of the present invention may be realized with a variety of other orientations and configurations of the way surfaces. For example, assuming one of the ways 24 were vertically offset from the other of the ways, application of the driving force between the uppermost of the way slide surfaces and the lowermost of the way slide surfaces would reduce, and in some cases eliminate, the vertical tilting moment of the slide about the way (as compared with the application of a driving force above the uppermost of the way surfaces or below the lowermost of the way surfaces). Also, where clamping of the slide assemblies to the lower way surfaces is not employed, the driving force could be effectively employed along a line generally coplanar with the upper way surfaces to substantially eliminate such tilting moment. From the foregoing it will be apparent that the driving force need only be properly directed to minimize or eliminate such tilting moment by taking into account the relative positions of any way slide surfaces.

With particular reference to FIGS. 6, 1 and 3, the manner in which the orientation of a workpiece 18 may be adjusted with respect to the support on the slides 20 and 22 may be understood. During feeding of bar stock workpieces such as the one illustrated at 18 to a position for cutting, it has been found that problems are sometimes presented in connection with interference of the bar stock with the support at the slide assemblies 20 and 22.

This support is generally L-shaped in nature and is provided in the form of a generally upwardly projecting support surface 136 and a generally laterally projecting support surface 138 (FIG. 3). In the preferred form of the invention, these support surfaces 136 and 138 are generally vertically and horizontally inclined so that application of a clamping force against the workpiece 18 by means of the clamping assembly 40 will be positively resisted by both of the support surfaces 130 and 132 when the force is generally vertical in nature. However, it will be appreciated that the same effect may be accomplished when the surfaces 130 and 132 are not inclined provided that the clamping force is exerted, at least in part, toward the spacial intersection of the planes defined by the longitudinally extending surfaces 130 and 132.

At this point, it may be mentioned that the support surfaces may be formed by plates suitably attached to the slide base portion 55, such as by bolts 139. In this fashion, access to the lever receiving aperture 80 for purposes of positioning the driven liner members 112 is facilitated prior to assembly of the plates defining the support surfaces.

As best viewed in FIG. 6, the feeder slide 28 may be provided with a generally vertically projecting support surface 140 that is generally coplanar with the generally vertically projecting support surface 136 of the slide assembly 22. A generally laterally projecting support surface 142 is also suitably provided by the upper surfaces of the rollers of the roller support assembly 16. This surface 142 is generally coplanar with the corresponding surface 138 of the slide assembly 22. It will be appreciated that the feeder slide 28 is generally U-shaped in transverse cross-section and envelops the rails and rollers of the roller assembly 16.

Where generally straight bars 18 are involved, feeding of the bars may be accomplished through translation of the feeder slide 28 with the bar clamped thereto. Such clamping may be provided in any suitable manner such as for example by the hydraulic clamping assembly 144. This assembly is provided with a clamping surface 145 movable between extended and retracted positions toward and away from the workpiece, upon the application of pressure on opposite sides of a piston suitably attached to that surface 145. The clamping force is applied generally toward the support surface 140 to clamp the workpiece thereagainst.

In instances where, for example, the end portion of the bar 18 is crooked, translation of the feeder slide 28 and the clamped workpiece 18 toward the slide assemblies 20 and 22 may result in interference of the end portion of the workpiece with the slide assemblies. This problem may arise frequently with heavy steel bar stock having lengths in the range of 30 feet. Such stock is often not straight and can cause damage during feeding. To avoid such damage, cumbersome positioning techniques may be involved.

It will be apparent that a crooked bar may be generally oriented to avoid interference (during longitudinal feeding) with at least one of the slide assembly support surfaces (e.g., the generally laterally projecting surface 138). However, interference with the other support shelf surface (e.g., the generally vertically projecting surface 136) is sometimes unavoidable. According to the present invention, such interference may be avoided through laterally offsetting a portion of the support for the workpiece at the feeder slide 28.

For this purpose, a second hydraulic clamping means 146 is provided. This clamping means includes a clamping surface 147 movable, between extended and retracted positions, toward and away from the clamping face 145 of the other clamp 144. In the retracted position, the clamping face 147 is normally received within an aperture 148 defined in the member providing the generally upwardly projecting support surface 140 on the feeder slide 28. Thus, the clamping force 147 does not interfere with the normal orientation of clamped workpieces 18 that are generally straight.

Movement of the clamping face to an extended position may be accomplished by applying pressure to one face of a piston 149 connected with the clamping face 147 by means of a piston rod 150. However, where generally straight bars 18 are involved, such extension of the clamping face 147 is inhibited by means of a stop member 152.

This stop member 152 is connected to the piston rod 150 and includes a generally radial shoulder 154. The shoulder is engageable with an abutment 156 providing an end face of the cylinder of the piston and cylinder assembly 146. In the full line position illustrated in FIG. 6, pressurization of the piston and cylinder assembly 146 which would otherwise tend to extend the clamping face 147 is prevented from effecting such an extension through the engagement of the stop member shoulder 154 with the abutment 156.

The stop member 152 may be retracted with respect to the piston rod 150 in order to provide for adjusting of the limit of extension of the clamp face 147 as required. In the preferred embodiment, the coupling of the stop member 152 to the piston rod 150 is accomplished by threaded engagement with an externally threaded member 157 as indicated at 158.

This member 157 is also internally threaded as indicated at 159 for threaded reception by the end of the piston rod 150. In this fashion, screw adjustment of the stop member 152 may be easily accomplished while holding the projecting end of the member 157 in a stationary position, so as to prevent rotation of the entire piston and piston rod assembly during adjustment.

As illustrated in phantom at 160 in FIG. 6, the stop member 152 may, in that fashion, be threadingly retracted on the piston rod 150. In such instances the stop shoulder 154 will be longitudinally displaced with respect to the abutment 156, thereby permitting extension of the piston rod upon proper pressurization. Such pressurization also extends the clamping face 147 to the phantom line position indicated at 162 in FIG. 6.

As will be apparent, when the piston and cylinder assembly 146 is pressurized to extend that clamping surface 147 with a force greater than the clamping force exerted by the opposing clamping face 142, the bar 18 may be held laterally displaced in its clamped position. The amount of the adjustment of the stop member 152 and the resulting lateral displacement (shown in phantom in FIG. 6) are to be sufficient to avoid interference of the bar with the generally vertically projecting support surface 136 of the supporting shelf during feeding of the workpiece with feeder slide 28.

If desired, the pressurization of the feeder clamping assemblies 144 and 146, (as well as the cylinder 124 employed in connection with the movement of the slides 20 and 22; and the slide clamping cylinders 44, 46) may be controlled from a panel indicated at 164 (FIG. 1) in any suitable manner.

Although accomodation for feeding of crooked bars and the like has been described in connection with the use of hydraulic clamping assemblies, and in connection the provision for lateral offset of the bar, it will be apparent that the advantages of the present invention may be realized with other forms of clamps utilized to accomplish reorientation of the workpiece and in connection with offsets other than the lateral type. Generally, however, provision for lateral offset will be advantageously sufficient, since the initial orientation of the bar may be such as to preclude such interference other than that which may be so accomodated. Moreover, the use of hydraulic clamps to accomplish reorientation of the bar 18 is particularly advantageous, insofar as once adjustment of the one clamp is accomplished, the remaining clamp need not be monitored provided proper relative clamp pressures are employed.

Although the invention has been described in connection with particular preferred embodiments, it will be appreciated by those skilled in the art that additions, modifications, substitutions, and deletions may be engaged in without departing from the spirit or scope of the invention as defined in the appended claims.

What is claimed is:

1. A cutting apparatus for severing the end portion of a workpiece from the remainder thereof, the apparatus comprising:
   a stationary base member;
   support means mounted on said stationary base member for supporting the workpiece;
   cutter means, movable relative to the supported workpiece, for severing the workpiece into first and second portions, said cutter means being returnable relative to the workpiece through the path of the cut made thereby;
   at least one translatable slide means, including at least a portion of said support means and including clamp means for clamping said workpiece thereto, for generally linearly moving one of said severed portions in a generally linear direction away from the zone of said cut;
   way means for slidably supporting said translatable slide means and defining upper and lower slide surface means extending generally longitudinally in said generally linear direction;
   said translatable slide means including clamping means for clamping said translatable slide means to both said upper and lower slide surface means of said way means; and,
   slide moving means for translating said translatable slide means along said upper and lower slide surface means in said generally linear direction and in a linear direction generally opposite thereto;
   said slide moving means including driving means for applying a slide moving force to said slide means in a generally longitudinally extending driving direction intermediate said upper and lower slide surface means.

2. The cutting apparatus according to claim 1 wherein:
   said driving means is operative to apply said slide moving force to said slide means at a substantially constant contact zone.

3. The cutting apparatus according to claim 1 wherein:
   said way means includes first and second generally parallel ways each having upper and lower way surfaces respectively comprising said upper and lower slide surface means, and wherein;
   said driving means is operative to apply said slide moving force with said driving direction extending generally centrally of said upper and lower way surfaces.

4. The cutting apparatus according to claim 3 wherein said driving means comprises:
   pivotal lever means having a pivot arm including a generally arcuate force transmitting surface engageable with a driven surface of said slide means disposed generally transversely of said generally linear direction;
   said force transmitting surface being engageable with said driven surface of said slide means, during pivoting of said lever means within the range of linear movement of said slide means, along a substantially constant contact zone.

5. The cutting apparatus according to claim 4 wherein:
   said lever means comprises a bell crank lever with a second pivot arm, the apparatus further including:
   adjustable stop means engageable with said second pivot arm on opposite sides thereof.

6. The cutting apparatus according to claim 1 wherein:
   said driving means comprises a pivotable lever means having a pivot arm including generally arcuate force transmitting surfaces; and wherein:
   said slide means includes means defining a slot for receiving a portion of said lever means including said force transmitting surfaces;

said slot being bounded by driven surfaces adjacent and engageable with said force transmitting surfaces and extending generally transversely of said generally linear direction; and said force transmitting surfaces being engageable with an adjacent driven surface at a substantially constant contact zone during pivoting of said lever means to move said slide means.

7. The cutting apparatus according to claim 6 wherein:

said driven surfaces and said force transmitting surfaces are comprised of case hardened steel.

8. A cutting apparatus for severing the end portion of a workpiece from the remainder thereof, the apparatus comprising:

a stationary base member;

support means mounted on said stationary base member for supporting the workpiece;

cutter means, movable relative to the supported workpiece, for severing the workpiece into first and second portions, said cutter means being returnable relative to the workpiece through the path of the cut made thereby;

at least one translatable slide means, including at least a portion of said support means and including clamp means for clamping said workpiece thereto, for generally linearly moving one of said severed portions in a generally linear direction away from the zone of said cut;

way means for slidably supporting said translatable slide means on at least an upper slide surface; and slide moving means for translating said slide means along said at least an upper surface in said generally linear direction and in a linear direction generally opposite thereto;

said slide moving means including driving means for applying a slide moving force to said slide means in a generally longitudinally extending driving direction extending at a level to minimize any vertical tilting moment of said slide means about said way means.

9. The cutting apparatus according to claim 8 wherein:

said driving means is operative to apply said slide moving force to said slide means at a substantially constant contact zone.

10. The cutting apparatus according to claim 9 wherein:

said driving means comprises a pivotable lever means having a pivot arm including generally arcuate force transmitting surfaces; and wherein:

said slide means includes means defining a slot for receiving a portion of said lever means including said force transmitting surfaces;

said slot being bounded by driven surfaces adjacent and engageable with said force transmitting surfaces and extending generally transversely of said generally linear direction; and said force transmitting surfaces being engageable with an adjacent driven surface at a substantially constant contact zone during pivoting of said lever means to move said slide means.

11. A cutting apparatus for severing the end portion of a workpiece from the remainder thereof, the apparatus comprising:

a stationary base member;

support means mounted on said stationary base member for supporting the workpiece;

cutter means, movable relative to the supported workpiece, for severing the workpiece into first and second portions, said cutter means being returnable relative to the workpiece through the path of the cut made thereby;

at least one translatable slide means, including at least a portion of said support means and including clamp means for clamping said workpiece therto, for generally linearly moving one of said severed portions in a generally linear direction away from the zone of said cut;

way means for slidably supporting said translatable slide means and defining upper and lower guide surface means; and slide moving means for translating said translatable slide means along said way means in said generally linear direction and in a linear direction generally opposite thereto;

said slide moving means including driving means for applying a slide moving force to said slide means in a driving direction intermediate said upper and lower guide surface means.

12. The cutting apparatus according to claim 11 wherein:

said driving means is operative to apply said slide moving force to said slide means at a substantially constant contact zone.

13. The cutting apparatus according to claim 12 wherein said driving means comprises:

pivotable lever means having a pivot arm including a generally arcuate force transmitting surface engageable with a driven surface of said slide means disposed generally transversely of said generally linear direction;

said force transmitting surface being engageable with said driven surface of said slide means, during pivoting of said lever means within the range of linear movement of said slide means, along a substantially constant contact zone.

14. A method for severing a workpiece with a cutter means relatively movable with respect to the workpiece, the method comprising:

supporting the workpiece in a position generally transverse to the direction of movement of the cutter means relative to the workpiece;

moving the cutter means relative to the workpiece to sever the workpiece into first and second portions;

clamping the workpiece to a portion of its support on a translatable slide means slidable on way means defining upper and lower slide surface means, and clamping the slide means to the way means;

translating at least one severed portion of the workpiece in a generally linear direction away from the zone of the cut made by the cutter means by applying a slide moving force to the slide means in a generally longitudinally extending driving direction intermediate the upper and lower slide surface means;

returning the cutter relative to the workpiece through the path of the cut made thereby; and moving the slide means in a direction generally opposite to said generally linear direction.

15. The method according to claim 14 wherein the way means includes first and second generally parallel ways each having upper and lower way surfaces respectively comprising said upper and lower slide surface means and wherein the translating step comprises:

applying said slide moving force with said driving direction extending generally centrally of said upper and lower way surfaces.

16. The method according to claim 15 wherein the translating step further comprises:

applying the slide moving force to the slide means at a substantially constant contact zone.

17. The method according to claim 14 wherein the translating step further comprises:

applying the slide moving force to the slide means at a substantially constant contact zone.

18. A method for severing a workpiece with a cutter means relatively movable with respect to the workpiece, the method comprising:

supporting the workpiece in a position generally transverse to the direction of movement of the cutter means relative to the workpiece;

moving the cutter means relative to the workpiece to sever the workpiece into first and second portions;

clamping the workpiece to a portion of its support on a translatable slide means slidable on way means defining at least an upper slide surface;

translating at least one severed portion of the workpiece in a generally linear direction away from the zone of the cut made by the cutter means by applying a slide moving force to the slide means in a generally longitudinally extending driving direction extending at a level to minimize any vertical tilting moment of the slide means about the way means;

returning the cutter relative to the workpiece through the path of the cut made thereby; and moving the slide means in a direction generally opposite to said generally linear direction.

19. The method according to claim 18 wherein the translating step further comprises:

applying the slide moving force to the slide means at a substantially constant contact zone.

20. A method for severing a workpiece with a cutter means relatively movable with respect to the workpiece, the method comprising:

supporting the workpiece in a position generally transverse to the direction of movement of the cutter means relative to the workpiece;

moving the cutter means relative to the workpiece to sever the workpiece into first and second portions;

clamping the workpiece to a portion of its support on a translatable slide means slidable on way means defining upper and lower guide surface means;

translating at least one severed portion of the workpiece in a generally linear direction away from the zone of the cut made by the cutter means by applying a slide moving force to the slide means in a generally longitudinally extending driving direction intermediate the upper and lower guide surface means;

returning the cutter relative to the workpiece through the path of the cut made thereby; and moving the slide means in a direction generally opposite to said generally linear direction.

21. The method according to claim 20 wherein the translating step further comprises:

applying the slide moving force to the slide means at a substantially constant contact zone.

* * * * *